(12) United States Patent
Bulea

(10) Patent No.: US 8,618,428 B2
(45) Date of Patent: Dec. 31, 2013

(54) SYSTEM AND METHOD FOR DETERMINING OBJECT INFORMATION USING AN ESTIMATED RIGID MOTION RESPONSE

(75) Inventor: Mihai M. Bulea, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 350 days.

(21) Appl. No.: 12/968,000

(22) Filed: Dec. 14, 2010

(65) Prior Publication Data

US 2012/0146935 A1 Jun. 14, 2012

(51) Int. Cl.
*G06F 3/044* (2006.01)
*G06F 3/045* (2006.01)

(52) U.S. Cl.
USPC ........................................ 178/18.04; 345/174

(58) Field of Classification Search
USPC .............................. 345/173, 174; 178/18.06
See application file for complete search history.

(56) References Cited

U.S. PATENT DOCUMENTS

| | | | |
|---|---|---|---|
| 5,510,813 | A | 4/1996 | Makinwa et al. |
| 5,854,625 | A | 12/1998 | Frisch et al. |
| 5,942,733 | A | 8/1999 | Allen et al. |
| 5,945,980 | A | 8/1999 | Moissev et al. |
| 6,002,389 | A | 12/1999 | Kasser |
| 6,034,672 | A | 3/2000 | Gaultier et al. |
| 6,642,857 | B1 | 11/2003 | Schediwy et al. |
| 7,158,122 | B2 | 1/2007 | Roberts |
| 7,196,694 | B2 | 3/2007 | Roberts |
| 7,511,702 | B2 | 3/2009 | Hotelling |
| 7,538,760 | B2 | 5/2009 | Hotelling et al. |
| 7,683,894 | B2 | 3/2010 | Kent |
| 2002/0149571 | A1 | 10/2002 | Roberts |
| 2003/0206162 | A1 | 11/2003 | Roberts |
| 2004/0227736 | A1 | 11/2004 | Kamrath et al. |
| 2006/0227114 | A1 | 10/2006 | Geaghan et al. |
| 2008/0078590 | A1 | 4/2008 | Sequine |
| 2009/0115733 | A1 | 5/2009 | Ma et al. |

(Continued)

FOREIGN PATENT DOCUMENTS

| | | |
|---|---|---|
| EP | 1826657 A1 | 8/2007 |
| WO | 9402921 | 2/1994 |

OTHER PUBLICATIONS

United States Patent and Trademark Office, U.S. Non-final Office Action mailed Sep. 14, 2012 for U.S. Appl. No. 12/948,455.
U.S. Appl. No. 09/716,639, filed Oct. 20, 1998.
European Patent Office, International Searching Authority, "International Search Report" mailed Apr. 10, 2012; International Appln. No. PCT/US2011/057731, filed Oct. 25, 2011.
Korean Intellectual Property Office, International Searching Authority, "International Search Report and Written Opinion" mailed Jul. 11, 2012; International Appln. No. PCT/US2011/063763, filed Dec. 7, 2011.
The International Bureau of WIPO, International Preliminary Report on Patentability in PCT International Application No. PCT/US2011/057731, mailed May 30, 2013.
United States Patent and Trademark Office, Final Office Action dated Feb. 19, 2013 for U.S. Appl. No. 12/948,455.

(Continued)

*Primary Examiner* — Kevin M Nguyen
(74) *Attorney, Agent, or Firm* — Ingrassia Fisher & Lorenz P.C.

(57) ABSTRACT

The embodiments described herein provide devices and methods that facilitate improved performance. Specifically, the devices and methods provide the ability to determine object information for objects causing rigid motion on a capacitive sensor device. In one embodiment, the device and method is configured to determine an estimated rigid motion response associated with a substantially rigid motion of the at least one sensing electrode using a set of sensor values, where the substantially rigid motion was caused by one or more objects in contact with the input surface. The estimated rigid motion response at least partially accounts for effects of capacitive coupling with the object(s) in contact with the input surface. The device and method may determine object information using the estimated rigid motion response. Where the input device is used to direct an electronic system, the object information may be used to facilitate a variety of interface actions.

21 Claims, 8 Drawing Sheets

(56) References Cited

U.S. PATENT DOCUMENTS

| | | |
|---|---|---|
| 2009/0243817 A1 | 10/2009 | Son |
| 2010/0026655 A1 | 2/2010 | Harley |
| 2010/0066670 A1* | 3/2010 | Amm et al. .................. 345/157 |
| 2010/0200309 A1* | 8/2010 | Yilmaz et al. ............. 178/18.03 |
| 2010/0277431 A1 | 11/2010 | Klinghult |
| 2010/0308844 A1 | 12/2010 | Day et al. |
| 2011/0153243 A1 | 6/2011 | Modafe |
| 2011/0175671 A1 | 7/2011 | Reynolds |
| 2011/0278078 A1 | 11/2011 | Schediwy et al. |
| 2011/0298746 A1 | 12/2011 | Hotelling |
| 2012/0068966 A1 | 3/2012 | Washburn et al. |
| 2012/0081276 A1 | 4/2012 | Ullrich et al. |
| 2012/0146935 A1* | 6/2012 | Bulea ........................... 345/174 |

OTHER PUBLICATIONS

The International Bureau of WIPO, International Preliminary Report on Patentability in PCT International Application No. PCT/US2011/063763, mailed Jun. 27, 2013.

The International Searching Authority, International Search Report and Written Opinion in PCT International Application No. PCT/US2013/034278, mailed Jul. 22, 2013.

\* cited by examiner

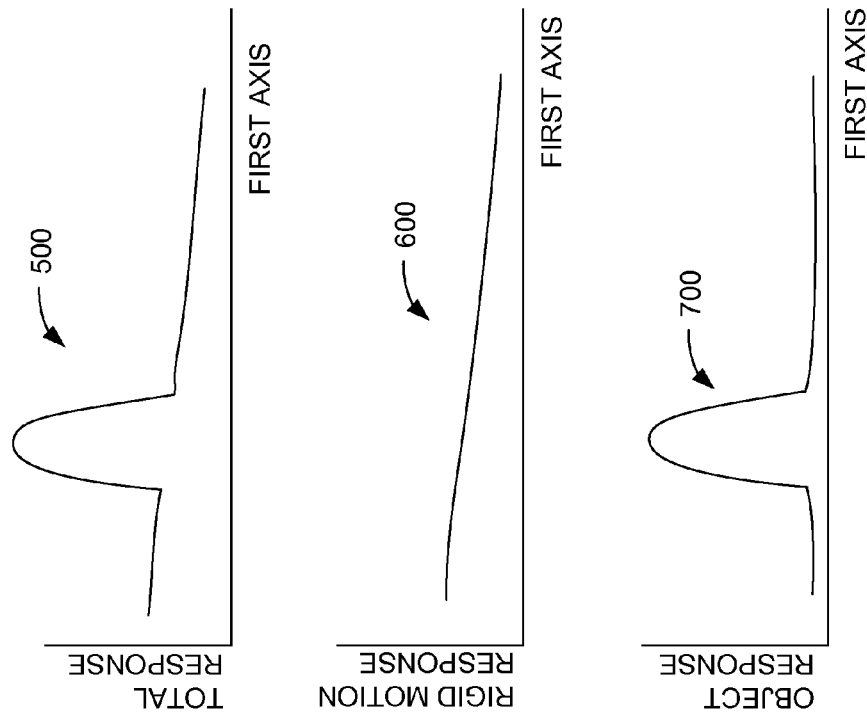
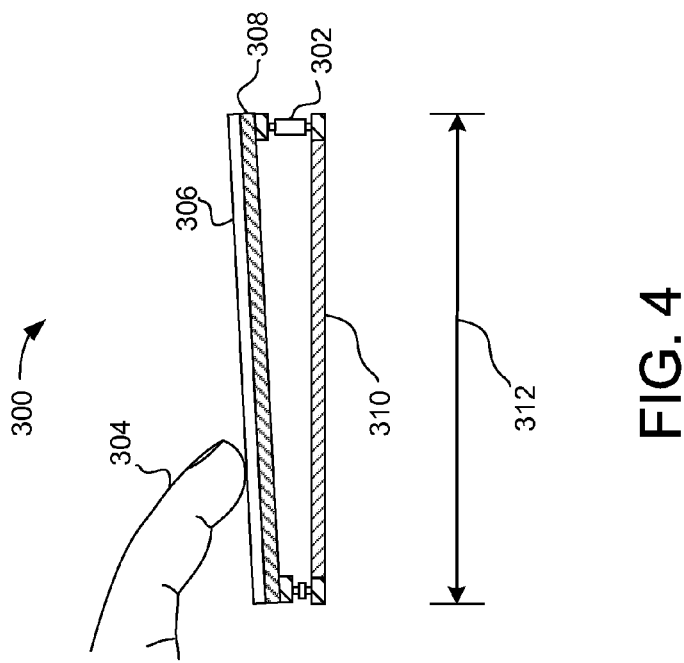

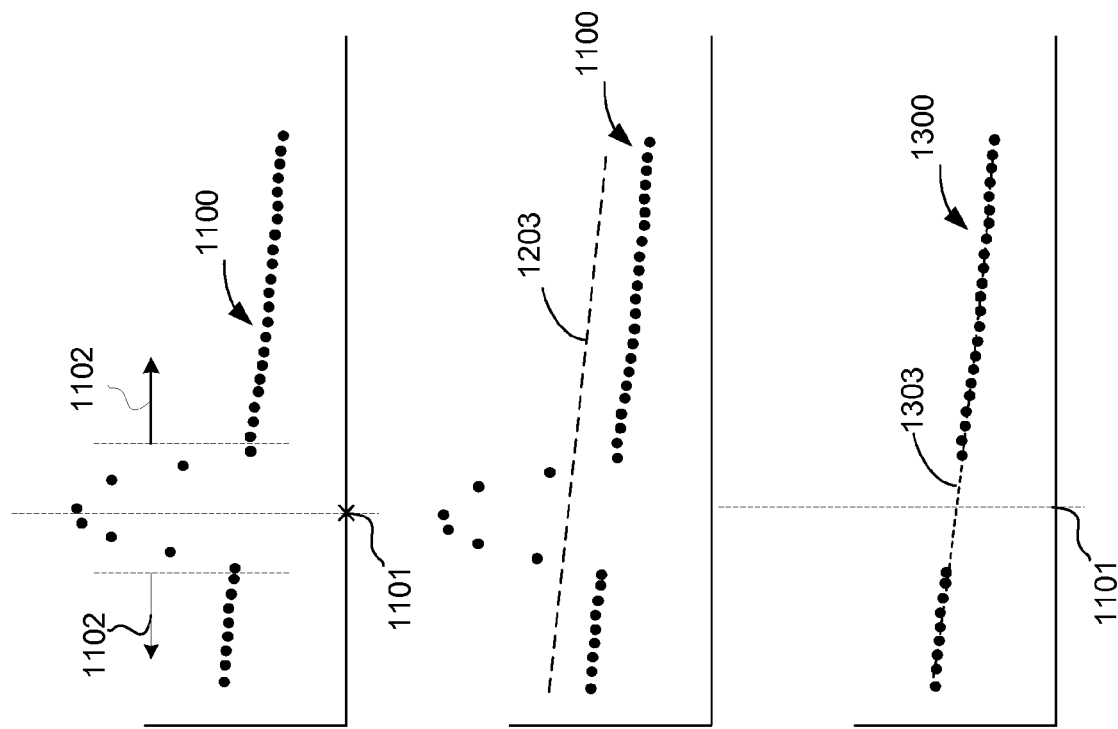

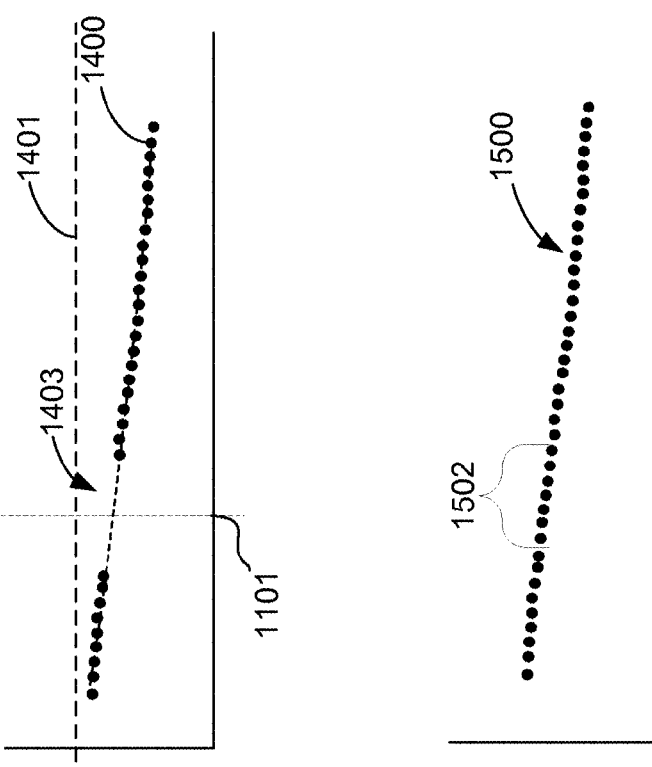

SYSTEM AND METHOD FOR DETERMINING OBJECT INFORMATION USING AN ESTIMATED RIGID MOTION RESPONSE

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some proximity sensor devices are detrimentally affected by physical deflection of parts of the sensor devices. For example, when a user touches or pushes on an input surface of a proximity sensor device, the input surface and the underlying sensing electrodes may be deflected to such an extent that the deflection degrades the performance of the device. For example, some proximity sensor devices may thus produce inaccurate measurements, estimates, or other information. Such degradation may be evident in touch screen devices and non-touch screen devices.

Some proximity sensor devices, or electronic systems in communications with proximity sensor devices, would also benefit from information about forces applied to the input surfaces of the sensor devices.

Thus, methods and devices for addressing the above are desirable. Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved sensor devices. Specifically, the devices and methods provide the ability to determine object information for objects causing rigid motion on a capacitive sensor device. Example object information includes positional information and force estimates, such as for objects causing rigid motion. The devices and methods at least partially account for the effects of capacitive coupling with the objects causing the rigid motion in determining the object information.

In one embodiment, a capacitive input device comprises an input surface, at least one sensing electrode, and a processing system communicatively coupled to the at least one sensing electrode. The input surface is contactable by objects in a sensing region, and the at least one sensing electrode is configured to capacitively couple with objects in the sensing region. The processing system is configured to determine an estimated rigid motion response associated with a substantially rigid motion of the at least one sensing electrode using a set of sensor values, where the substantially rigid motion was caused by one or more objects in contact with the input surface. The estimated rigid motion response at least partially accounts for effects of capacitive coupling with the object(s) in contact with the input surface. The processing system is further configured to determine object information using the estimated rigid motion response. Where the input device is used to direct an electronic system, the object information may be used to facilitate a variety of interface actions on a variety of different electronic systems.

The estimated rigid motion response may be used to determine object information such as force or position estimates. The object information may be determined through iterative procedures, such as to produce refined, more accurate object information.

In one particular embodiment, the object information may be a force estimate for one or more objects causing the rigid motion of the at least one sensing electrode.

BRIEF DESCRIPTION OF DRAWINGS

The preferred exemplary embodiment of the present invention will hereinafter be described in conjunction with the appended drawings, where like designations denote like elements, and:

FIGS. 3 and 4 are cross sectional side views of an input device in accordance with an embodiment of the invention;

FIGS. 5, 6 and 7 are projections of an exemplary total response, rigid motion response, and object response in accordance with an embodiment of the invention;

FIGS. 11-15 are graphical representations of sensor values in accordance with embodiments of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
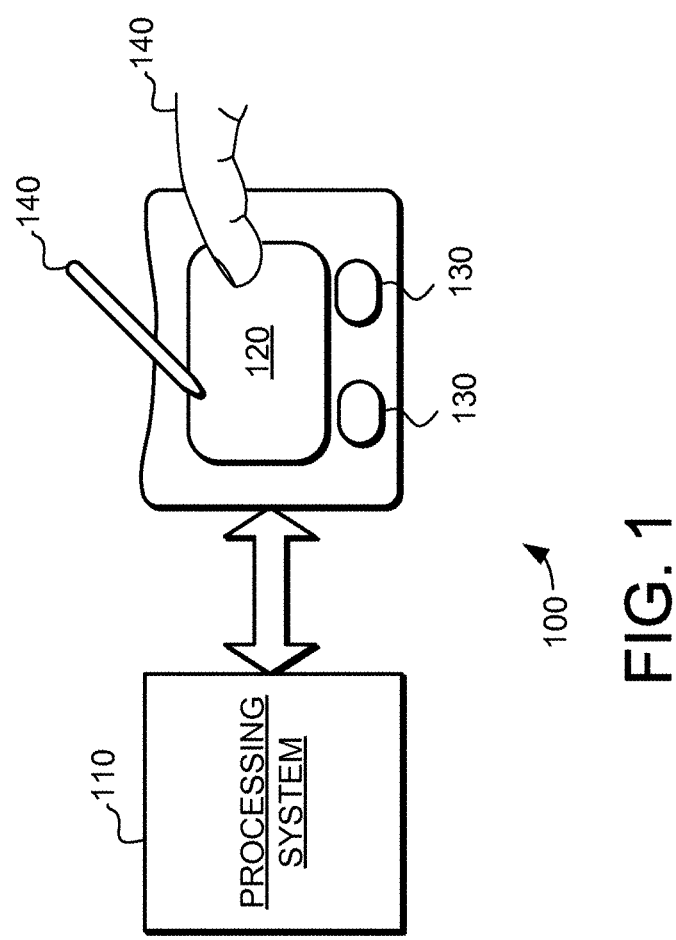
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensing electrodes reside, by face sheets applied over the sensing electrodes or any casings, etc. In some embodiments, the sensing region 120 has a rectangular shape when projected onto an input surface of the input device 100.

The input device 100 may utilize any combination of sensor components and capacitive sensing technologies to detect user input in the sensing region 120. For example, the input device 100 comprises one or more sensing elements for capacitively detecting user input.

Some implementations are configured to provide images that span one, two, or three dimensions in space. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensing electrodes. Some capacitive implementations utilize resistive sheets, which may be uniformly resistive.

Some capacitive implementations utilize "self capacitance" (or "absolute capacitance") sensing methods based on changes in the capacitive coupling between sensing electrodes and an input object. In various embodiments, an input object near the sensing electrodes alters the electric field near the sensing electrodes, thus changing the measured capacitive coupling. In one implementation, an absolute capacitance sensing method operates by modulating sensing electrodes with respect to a reference voltage (e.g. system ground), and by detecting the capacitive coupling between the sensing electrodes and input objects.

Some capacitive implementations utilize "mutual capacitance" (or "transcapacitance") sensing methods based on changes in the capacitive coupling between sensing electrodes. In various embodiments, an input object near the sensing electrodes alters the electric field between the sensing electrodes, thus changing the measured capacitive coupling. In one implementation, a transcapacitive sensing method operates by detecting the capacitive coupling between one or more transmitting electrodes and one or more receiving electrodes. Transmitting sensing electrodes may be modulated relative to a reference voltage (e.g., system ground) to facilitate transmission, and receiving sensing electrodes may be held substantially constant relative to the reference voltage to facilitate receipt. Sensing electrodes may be dedicated transmitters or receivers, or may be configured to both transmit and receive.

In FIG. 1, a processing system (or "processor") 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components; in some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensing electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In accordance with some embodiments, a position acquisition module is configured to acquire a set of sensor values using at least one sensing element of the input device. Likewise, a determiner module is configured to determine an estimated rigid motion response associated with a rigid motion of the at least one sensing element using the set of sensor values, the rigid motion caused by a force applied by an object to the input device, wherein the estimated rigid motion response at least partially accounts for effects of capacitive coupling with the object. The determiner module may also be configured to determine object information from the estimated rigid motion response.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes position in a plane. Exemplary "three-dimensional" positional information includes position in space and position and magnitude of a velocity in a plane. Further examples include other representations of spatial information. Historical data regarding one or more types of positional information may also be determined and/or stored, including, for example, historical data that tracks position, motion, or instantaneous velocity over time. Likewise, a "position estimate" as used herein is intended to broadly encompass any estimate of object location regardless of format. For example, some embodiments may represent a position estimates as two dimensional "images" of object location. Other embodiments may use centroids of object location.

"Force estimate" as used herein is intended to broadly encompass information about force(s) regardless of format. Force estimates may be in any appropriate form and of any appropriate level of complexity. For example, some embodiments determine an estimate of a single resulting force regardless of the number of forces that combine to produce the resultant force (e.g. forces applied by one or more objects apply forces to an input surface). Some embodiments determine an estimate for the force applied by each object, when multiple objects simultaneously apply forces to the surface. As another example, a force estimate may be of any number of bits of resolution. That is, the force estimate may be a single bit, indicating whether or not an applied force (or resultant force) is beyond a force threshold; or, the force estimate may be of multiple bits, and represent force to a finer resolution. As a further example, a force estimate may indicate relative or absolute force measurements. As yet further examples, some embodiments combine force estimates to provide a map or an "image" of the force applied by the object(s) to the input surface. Historical data of force estimates may also be determined and/or stored.

The positional information and force estimates are both types of object information that may be used to facilitate a full range of interface inputs, including use of the proximity sensor device as a pointing device for selection, cursor control, scrolling, and other functions.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensing electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In one embodiment, an input device 100 comprises an input surface and at least one sensing electrode, with the sensing electrode communicatively coupled to the processing system 110. In this embodiment the input surface is contactable by objects in a sensing region, and the at least one sensing electrode is configured to capacitively couple with objects in the sensing region and to deflect in response to force applied to the input surface by objects in contact with the input surface. The processing system 110 is configured to determine an estimated rigid motion response associated with a rigid motion of the at least one sensing electrode using a set of sensor values, where the rigid motion was caused by an object in contact with the input surface. The determined estimated rigid motion response at least partially accounts for effects of capacitive coupling with the object in contact with the input surface, and the processing system is further configured to determine object information using the estimated rigid motion response. This object information may be used to facilitate a variety of interface actions on a variety of different electronic devices.

In one example, the processing system 110 may use the estimated rigid motion response to determine a force estimate (or multiple force estimates) for the object(s) causing the rigid motion. In another example, the processing system 110 may use the estimated rigid motion response to determine a position estimate (or multiple position estimates) for the object(s) causing the rigid motion. Such force and position estimates may be produced with or without iterations of other force or position estimates.

Figure 2:
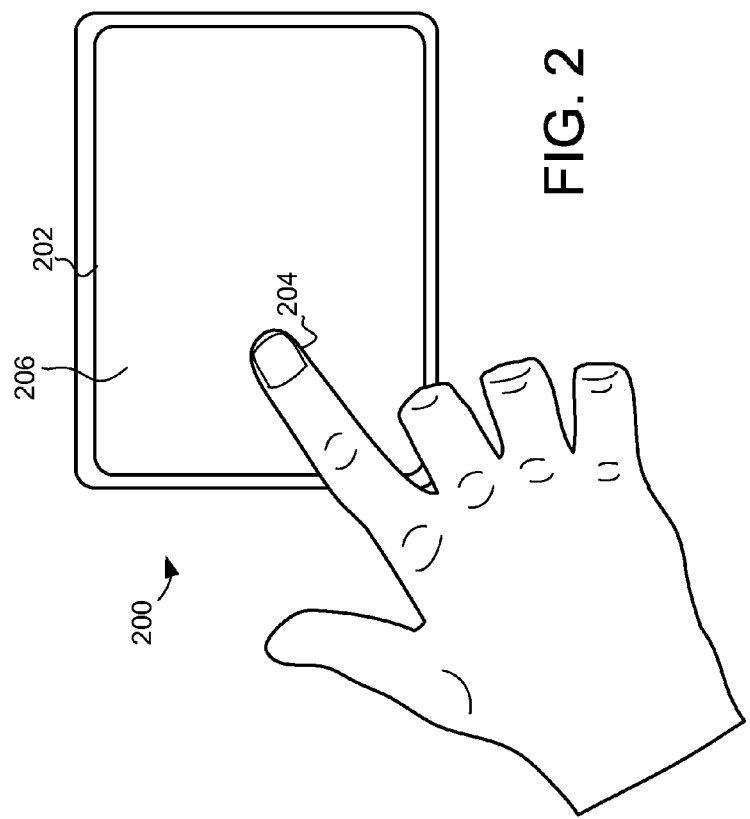
FIG. 2 is a top view of an input device in accordance with an embodiment of the invention.

Turning now to FIG. 2, a top view of an exemplary input device 200 is illustrated. The input device 200 includes an input surface 206 and at least one sensing electrode (not shown). The input device 200 also includes a processing system (not shown) communicatively coupled to the at least one sensing electrode. The input device 200 is configured to capacitively sense objects (e.g., finger 204) in a sensing region 202 using the at least one sensing electrode. As was described above, the at least one sensing electrode can comprise any number of sensing electrodes of in any of a variety of arrangements. For example, the at least one sensing electrode can comprise a single sensing electrode, a set of sensing electrode aligned along one axis, arrays of electrodes aligned along orthogonal axes, and other configurations or spatial arrangements. Similarly, the at least one sensing electrode can be of any appropriate shape. For example, the at least one sensing electrode can reside in a single plane or be non-planer, and can have any number of curvy or linear portions, and of any appropriate size.

Where one or more objects in the sensing region 202 apply force to the input surface 206, it causes substantially rigid motion in the input surface and the at least one sensing electrode. "Substantially rigid motion" is used here to encompass all types of rotation or translation of the electrode, but without significant changes in shape, size or curvature of the electrode. Rigid motion, by itself, thus does not include any substantial change in electrode characteristics such as shape, size or curvature. Conversely, examples of non-rigid motion include situations where a body deforms or changes in shape. Specific examples of non-rigid motion of an electrode include stretching, compression, bending, and twisting.

It should be noted that the type of deflection occurring in response to force by the input objects will depend largely upon the structure of the input device. For example, a variety of input devices are specifically designed and configured to provide for rigid motion in response to force applied by one or more objects. These devices typically have electrodes that are configured to be relatively rigid, and typically include various mountings, supports, or other mechanisms to allow for translation and/or rotation of the electrodes.

Of course, in many devices various degrees of rigid and non-rigid motion will occur in response to objects applying force to the surface. The embodiments described herein are particularly applicable to devices where a relatively large amount of rigid motion will occur in response to force, along with a relatively small amount of non-rigid motion.

With input device 200, capacitive measurements obtained using the at least one sensing electrode includes both the effects of capacitive coupling to objects in the sensing region 202 and the effects of rigid motion of the at least one sensing electrode. The effects rigid motion can affect the accuracy of detecting objects in the sensing region, and can provide additional information about input provided by objects to the input device 200.

The term "rigid motion response" is used here to refer to the change in the capacitive coupling to the at least one sensing electrode that occur due to the rigid motion. That is, the rigid motion causes changes in the position of the at least one sensing electrode relative to other parts of the input device and the environment. For example, by translating closer to or away from other elements, and/or by rotating such that portions of the at least one sensing electrode move toward and/or away from the other elements. This change in relative position is such that the electric field surrounding the at least one sensing electrode is changed. This changes the capacitive coupling experienced by the at least one sensing electrode, and changes the sensor values that are produced using the at least one sensing electrode. Thus, the "rigid motion response" refers to an electrical response to the rigid motion.

The term "estimated rigid motion response" refers to the values determined by the input device (e.g. by the input device's processing system or some other processing element) that correspond to an estimate of the rigid motion response. The estimated rigid motion response may be in capacitance units, or some other units that reflect the changes in capacitance. Generally, the estimated rigid motion response is produced by accounting (in whole or in part) for the effects of capacitive coupling between the at least one sensing electrode and the at least one object causing the rigid motion.

Similarly, "object response" is used here to refer to the change in the capacitive coupling to the at least one sensing electrode that occur due to input object(s) being present and/or moving in the sensing region. Also, "estimated object response" refers to the values determined by the input device (e.g. by the input device's processing system or some other processing element) that correspond to an estimate of the object response.

The input device (e.g. through its processing system or other processing element) is configured to obtain a set of sensor values using the at least one sensing electrode, determine an estimated rigid motion response, and determine object information using the estimated rigid motion response. The estimated rigid motion response is associated with a rigid motion of the at least one sensing electrode using the set of sensor values. The rigid motion is caused by at least one object in contact with the input surface, and the estimated rigid motion response at least partially accounts for effects of capacitive coupling with the at least one object in contact with the input surface.

The sensor device may further comprise one or more conductors proximate to the at least one sensing electrode, wherein a capacitive coupling between the conductor(s) and the at least one sensing electrode changes with the rigid motion of the at least one sensing electrode. The conductor(s) may be of any shape or arrangement with respect to the at least one sensing electrode. For example, the conductor(s) may overlap, flank or surround, interleave, the at least one sensing electrode.

For example, the sensor device may further comprise a display screen underlying the at least one sensing electrode. The display screen may comprise one or more conductor(s) configured for use in displaying images on the display screen, where the capacitive coupling between the conductor(s) and the at least one sensing electrode changes with the rigid motion of the at least one sensing electrode.

The object information may comprise a position estimate, a force estimate, and/or some other estimate related to the object(s) in the sensing region or in contact with the input surface.

The processing system may be configured to determine the estimated rigid motion response in a variety of ways. In certain embodiments the estimated rigid motion response may be assumed to be largely linear and/or planar. For example, in embodiments where the at least one electrode and other significant conductive elements are arranged in substantially linear and/or planar arrangements. Assuming that the estimated rigid motion response is largely linear can be used to simplify the processing used to determine the estimated rigid motion response. For example, by using various linear and planar fitting techniques to determine the estimated rigid motion response.

Some example techniques for determining the estimated rigid motion response are described in the following paragraphs.

The processing system may be configured to determine the estimated rigid motion response by determining a position estimate for the at least one object in contact with the input surface, determining a subset of the set of sensor values corresponding to locations away from the position estimate, and using the subset to determine the estimated rigid motion response. The subset may be a non-empty, proper subset of the set of sensor values, such that it includes at least one value, and not all of the values, of the set of sensor values.

The processing system may be configured to determine the estimated rigid motion response by fitting a parameterized function to the set or subset of the sensor values. For example, where the rigid motion response can be assumed to be largely planar, by determining a linear fit or planar fit to the set or subset of sensor values. In some embodiments such a fitting can be performed multiple times. For example, by performing a first linear fitting of the set or subset of sensor values, filtering those values to at least partially remove values above the linear fitting, and then performing additional fittings. In these cases, the filtering could be for values above a set threshold, or for those values an amount above the linear fit.

The processing system may be configured to determine the estimated rigid motion response by determining a position estimate for the at least one object in contact with the input surface, and by using the position estimate to at least partially account for capacitive coupling effects associated with the at least one object in contact with the input surface.

The processing system may be configured to determine the object information in a variety of ways. Some examples are described in the following paragraphs.

The processing system may be configured to determine the object information by determining a position estimate using the estimated rigid motion response, determining a second estimated rigid motion response using the position estimate, and determining the object information using the second estimated rigid motion response. The second estimated rigid motion response is associated with the rigid motion of the at least one sensing electrode, and is a refinement over the first estimated rigid motion response.

The processing system may be further configured to determine a first position estimate for the at least one object in contact with the input surface. And the processing system may be configured to determine the estimated rigid motion response by using the set of sensor values and the first position estimate. And the processing system may be configured to determine the object information by determining a second position estimate for the at least one object in contact with the input surface using the estimated rigid motion response, where the second position estimate is a refinement over the first position estimate.

A variety of other techniques for determining estimated rigid motion responses and object information exist, and other examples are described below, in connection with other figures.

The processing system may be comprised of appropriate modules to perform the functions ascribed to it. For example, the processing system may comprise a position acquisition module and a determiner module. The position acquisition module may be configured to acquire a set of sensor values using at least one sensing electrode of the input device. The determiner module may be configured to determine an estimated rigid motion response and to determine object information using the estimated rigid motion response.

Figure 3:
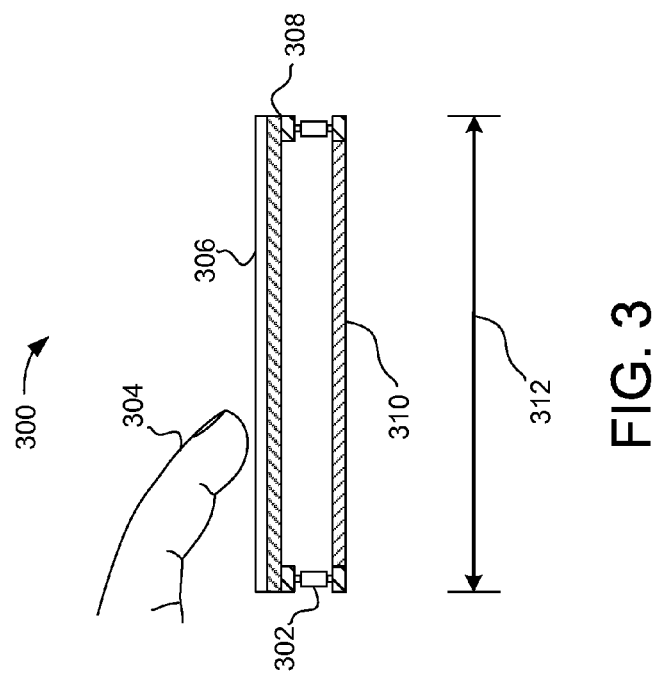

FIGS. 3-4 show an implementation of the example of FIG. 2. Specifically, FIGS. 3-4 show cross-sectional side views of an example input device 300 that has an input surface 306, at least one sensing electrode 308, and a conductor 310. The at least one sensing electrode 308 and input surface 306 are supported by mounting 302. A first axis 312 is also shown for orientation purposes. Also presented in FIGS. 3-4 is an input object 304 (a finger is shown) proximate to the input device 300. The mounting 302 and at least one sensing electrode 308 are configured such that force applied by the input object 304 to the input surface 306 causes the at least one sensing electrode 308 to experience rigid motion. This rigid motion changes the relative position of the electrode 308 to the conductor 310. The conductor 310 is proximate to the at least one sensing electrode 308, such that capacitive coupling between the conductor 310 and the at least one sensing electrode 308 changes in a measurable way with the rigid motion of the at least one sensing electrode 308 relative to the conductor 310.

That is, rigid motion of the at least one sensing electrode 308 changes the relative distances between portions of the at least one sensing electrode 308 and portions of the conductor 310, and changes the electric field around them. Where the at least one sensing electrode 308 is electrically modulated with respect to the conductor 310, this changes the capacitances measured by the at least one sensing electrode 308.

The conductor 310 can comprise portions of the input device 300 that are dedicated to changing the electric field around the at least one sensing electrode in response to rigid motion of the at least one sensing electrode, or have other functions. For example, the conductor 310 may also electrically shield the input device 300 from external noise sources or electrically shield external components from noise produced by the operation of the at least one sensing electrode 308.

As another example, in some embodiments, the input device 300 comprises a display screen underlying the at least one sensing electrode 308, and the conductor is also used for display functions. For example, the conductor 310 may be a display electrode used for display operation. The display electrode may be driven to one or more voltages during display operation, such as the one or more $V_{com}$ electrodes of liquid crystal display screens (LCDs) that are driven to a constant $V_{com}$ voltage or to multiple voltages during display operation.

The input device 300 may or may not include additional conductors that also change in capacitively coupling with the at least one sensing electrode 308 in response to rigid motion of the at least one sensing electrode 308. These additional conductors may also underlie the at least one sensing electrode 308, or be in some other arrangement with respect to the at least one sensing electrode 308.

It should be noted that the mounting 302 is merely exemplary of the various type of devices and structures that may be implemented in an input device to facilitate rigid motion. For example, mounting 302 may be a continuous of piecewise membrane, gasket, or adhesive. Mounting 302 may comprise discrete components such as springs, beams, or other pliable members. It should be noted that the type and arrangement of the mounting 302 is not important, as long as the mounting 302 provides a substantially repeatable compression/expansion, allowing rigid motion of the at lease one sensing electrode 308.

Turning now to FIG. 4, the input device 300 is illustrated with the input object 304 applying force to the input surface 306, such that the at least one sensing electrode 308 experiences rigid motion. In this illustrated example, the mounting 302 is configured to expand and contract, and the at least one sensing electrode 308 is rotating and translating in position. This causes some portions of the at least one sensing electrode 308 to move closer toward the conductor 310. It should also be noted that in this illustrated example, some portions of the electrode 308 are moved away from the conductor 310. However, this will not always be case, as in some embodiments the input device would be configured to translate only in one direction (although in varying degrees at different locations).

In any event, this rigid motion of the at least one sensing electrode 308 changes the capacitance measured by the at least one sensing electrode 308. The processing system (not shown) of the input device 300 is configured to determine an estimated rigid motion response associated with a rigid motion of the at least one sensing electrode 308 using a set of sensor values that includes the effects of the rigid motion. The rigid motion may be caused by input object 304 contacting the input surface 306. The processing system determines this estimated rigid motion response by at least partially accounting for the effects that capacitive coupling with the input object 304 (and other input objects as appropriate) has on the set of sensor values. The estimated rigid motion response can be used to determine a variety of object information 204.

FIGS. 5-7 illustrate an exemplary total response, rigid motion response, and object response for the input device 300. The examples of FIGS. 5-7 may be the response along a cross-section of a sensor (such as what may be associated with a row or column of pixels in an imaging sensor), a projection of responses (such as what may be associated with a profile sensor), or some other appropriate one-dimensional representation. Turning now to FIG. 5, an example of a total response 500 associated with the at least one sensing electrode 308 is illustrated in graphical form. Specifically, FIG. 5 shows an exemplary total response 500 for the rigid motion scenario illustrated in FIG. 4.

The total response 500 includes at least two distinct effects. A first portion of the total response is an object response that reflects changes due to the proximity and/or location of the input object 304 relative to the at least one sensing electrode 308. A second portion is a rigid motion response that reflects changes due to the rigid motion of the at least one sensing electrode 308. In many embodiments, and to first order, the object response and rigid motion responses are additive effects, and thus the total response can be considered to be the superposition of the object response and the rigid motion response. Thus, an object or a rigid motion response can be subtracted or otherwise removed from a total response without substantially affecting the other response—at least to first order.

In general, the changes associated with the object response are concentrated in the portions of the at least one sensing electrode 308 near the input object 304, since the changes to the electric field caused by the presence and motion of the input object 304 are relatively localized. Meanwhile, the changes associated with the rigid motion response cover the entire area corresponding to the sensing electrode.

Turning now to FIGS. 6 and 7, these figures illustrate an exemplary rigid motion response 600 and an exemplary object response 700 for the rigid motion scenario shown in FIG. 4. As may be seen in FIGS. 5, 6 and 7, the total response 500 is effectively the superposition of the rigid motion response 600 and the object response 700. In this example, the rigid motion response 600 may be described as largely linear. Again, this is largely dependent upon the structure and arrangement of electrodes and other elements in the input device.

In some embodiments of the invention, an input device (such as input device 200 or 300) is configured to obtain a set of sensor values using at least one sensing electrode. The set of sensor values may be reflective of a total response (such as total response 500) that includes a rigid motion response (such as rigid motion response 600) and an object response (such as object response 700). The set of sensor values are likely quantized, and formed of a discrete set of values that indicate measurements made using the at least one sensing electrode.

The input device is further configured to determine an estimated rigid motion response associated with a rigid motion of the at least one sensing electrode using the set of sensor values. That is, the input device develops an estimate of the actual rigid motion response using the sensor values obtained. The estimated rigid motion response may be in any appropriate form, including as discrete values, coefficients of functions, functions, and the like. The estimated rigid motion response at least partially accounts for the effects of capacitive coupling with the input object(s). That is, the estimated rigid motion response accounts for the object response to at least a partial extent. The input device is also configured to determine object information using the estimated rigid motion response.

In some embodiments, the sensor values and estimated rigid motion responses are made along one dimension, such as along the first axis of FIGS. 3-4. This may be the case in embodiments designed to provide projections of input along particular axes or planes (e.g. "profile" sensors). For example, profile sensors may generate sets of sensor values for defined coordinate systems, such as "X" and "Y" coordinates if using Cartesian coordinate systems.

Estimated rigid motion responses may also be made along one dimension in embodiments designed to provide images of two or higher dimensions, where particular one-dimensional sections or slices of the image are used in determining estimated rigid motion responses and object information. For example, one or multiple one-dimensional slices may be taken that intersect a peak (or multiple peaks) in the image, As another example, one or multiple one-dimensional slices may be taken, where each pass through a same estimated position of an input object (or through different estimated positions of multiple input objects).

In embodiments configured to provide images of two, three, or more dimensions, the sensor values and the estimated rigid motion response may be made along two dimensions (taking two-dimensional sections as appropriate). This approach can also be analogized to three and higher dimensions.

Figure 8:
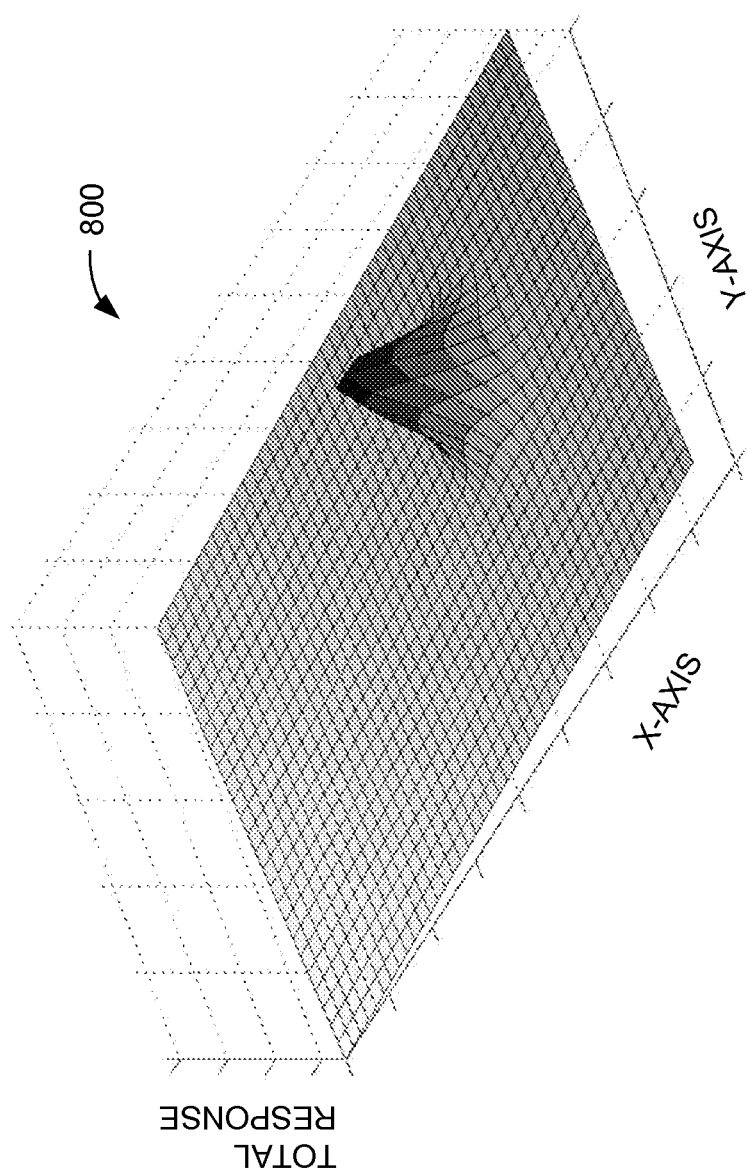
FIGS. 8, 9 and 10 are surface plots representing an exemplary total response, rigid motion response, and object response in accordance with an embodiment of the invention.
Figure 9:
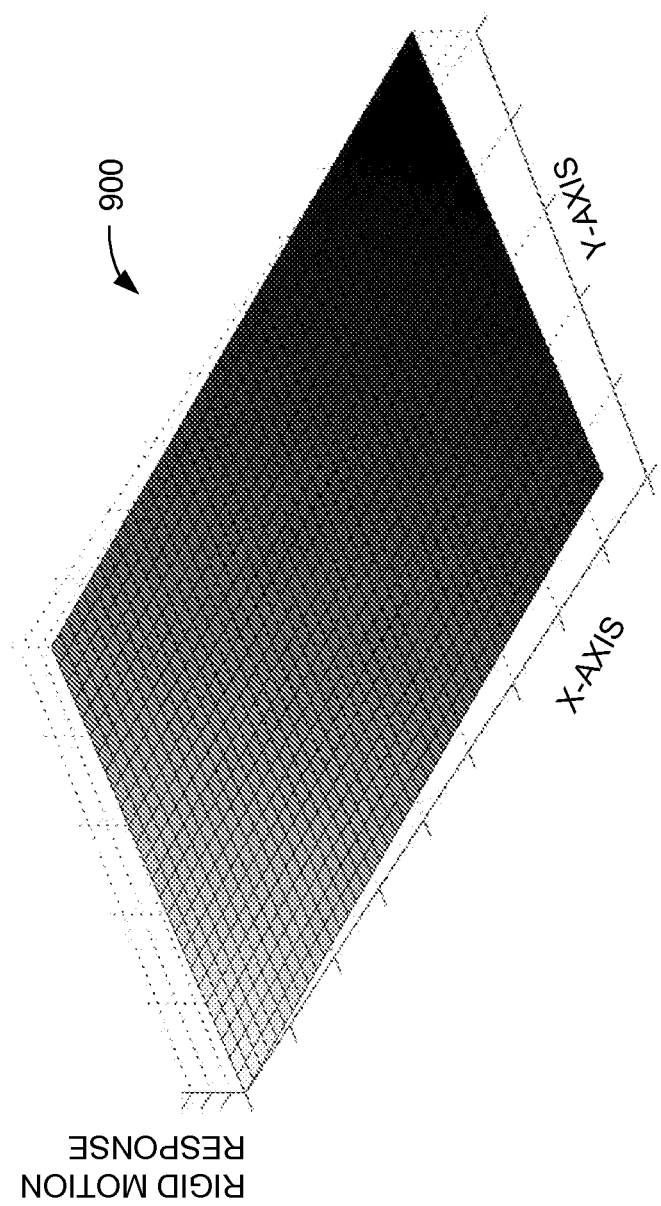
Figure 10:
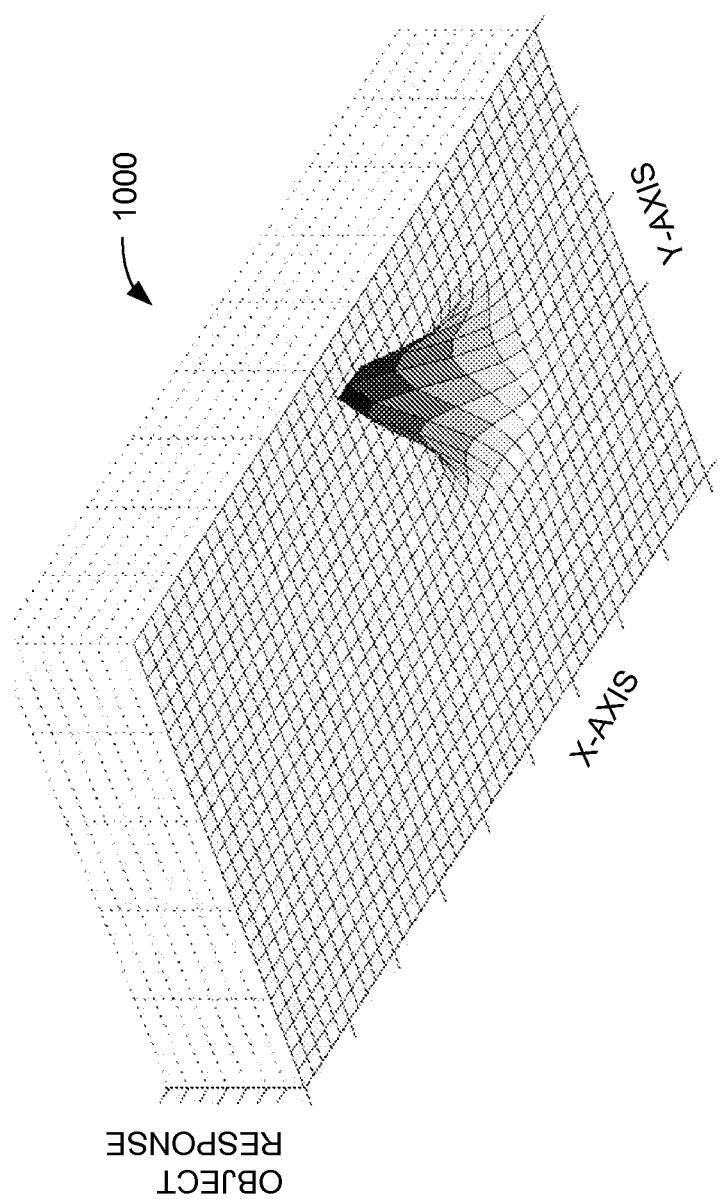

FIGS. 8-10 illustrate the total response, the object response, and the rigid motion response as a surface plots spanning first and second axes and corresponding to the sensing region. The first and second axes may be X and Y axes. FIGS. 8-10 illustrate these responses as two dimensional "images" of capacitive effects in the sensing region.

Turning now to FIG. 8, an exemplary two dimensional total response 800 for the example of FIGS. 3-4 is illustrated as a surface plot. Like the example of FIG. 5, total response 800 includes both rigid motion and object responses. And also like the previous examples, the estimated rigid motion response can be determined by accounting at least in part for the object response. Turning now to FIGS. 9 and 10, these figures illustrate an exemplary rigid motion response 900 and an exemplary object response 1000 for the exemplary total response 800 shown in FIG. 8. These responses have relationships with each other that are similar to those described in conjunction for FIGS. 5-7, except these are two dimensional instead of one dimensional.

In accordance with the embodiments of the invention, a variety of different techniques may be used to determine the estimated rigid motion response. In general, some techniques are based on an assumption that the at least one electrode will move with at least substantially rigid motion, and that the associated electrostatic changes that result will follow a predictable pattern. For example, will be largely linear or planar. Some techniques use filters or thresholds to remove or reduce the object response effects from the sensor values. Some techniques include fitting functions to part or all of the sensor values. Some techniques use estimated position(s) of the object(s) (in contact with the input device or in the sensing region of the input device) to effectuate accounting for the capacitive effects of the object(s). Other techniques may not use position estimates to determine the estimated rigid motion response.

Various embodiments may use these techniques in isolation, or in combination. For example, some embodiments may use position estimates with curve fits to produce estimated rigid motion responses. As another example, some embodiments may use thresholds and filters both to produce estimated rigid motion responses. Other examples use any combination and number of filters, thresholds, fits, and other techniques.

A variety of these techniques will now be discussed in greater detail.

As a first example, some embodiments use filters to determine an estimated rigid motion response. For example, in some embodiments, it may be assumed that the object response produces sharper changes in the sensor values than the rigid motion response, such that filtering out such sharper changes produces an adequate estimated rigid motion response for determining object information.

As yet another example, some embodiments use thresholds to determine estimated rigid motion responses. The thresholds may be set at manufacture, at start-up, during operation when particular input conditions are met, dynamically based on input conditions, etc. With thresholds, sensor values past or between particular thresholds may be removed or weighted differently from other sensor values. For example, in some embodiments, sensor values above a threshold value may be assumed to be largely due to object response and is removed. As another example, in some embodiments, sensor values above a threshold may be reduced according to an appropriate weighting function. As yet another example, sensor values below a threshold may be removed.

Some techniques use a determination of the position(s) of object(s) in the sensing region, such as the position of one or more objects causing the rigid motion to determine the estimated rigid motion response. The determination of the positions(s), referred to as a position estimate, is used in these techniques to account for at least some of the effects of capacitive coupling with the object(s) found in the set of sensor values. Furthermore, in some embodiments, other types of information may also be used with the position estimate to determine the estimated rigid motion response.

The position estimate may be determined using any suitable position determination technique and procedure. In some embodiments, objects entering, moving in, and exiting the sensing region change the electric field near the at least one electrode, such that the input device may capacitively detect objects through changes in the sensor values obtained using the at least one sensing electrode. The resulting changes in the sensor values may be used by itself, with one or more prior readings or baselines, and/or other information (such as prior force, rigid motion and position estimates) to determine the position(s) of object(s) in the sensing region, including object(s) in contact with the input device. Any appropriate data analysis method may be used to determine the position estimates from these sensor values, including detecting peaks, calculating centroids, etc.

Some embodiments use the position estimate to at least partially account for capacitive coupling effects with the object(s) in contact with the surface and causing rigid motion. For example, some embodiments use the position estimate to determine which subset of the sensor values are less affected by the capacitive coupling effects of the object(s), or which subset of the sensor values are more indicative of rigid motion effects. Some embodiments determine a subset of sensor values that correspond to locations away from the position estimate (that is, from position(s) indicated by the position estimate). The subset is non-empty, such that it contains at least one of the sensor values of the set; the subset is also proper, such that it does not contain all of the sensor values of the set. These embodiments use this subset to determine the estimated rigid motion response. This approach focuses on the sensor values associated with portions of the sensing region away from where objects are estimated to be (thus portions of the sensing region which are not estimated to contain objects). Generally, sensor values associated with portions away from the objects are primarily indicative of the capacitive effects associated with rigid motion.

Turning now to FIG. 11, an exemplary set of sensor values 1100 corresponding to those that may be obtained by the input device for the total response of FIG. 5 is illustrated. The set of sensor values reflect a measure of both the capacitive effects of rigid motion (the rigid motion response) and the capacitive effects of coupling with the object (the object response).

From the sensor values shown in FIG. 11, a position estimate may be made for an object that corresponds to location 1101. This position estimate can be used to determine a subset of sensor values that correspond to locations away from the position estimate. For example, the subset of values in regions 1102.

In the example of FIG. 11, the regions 1102 correspond to sensor values largely determined to be representing the rigid motion response. The subset of sensor values in regions 1102 correspond to locations away from the position estimate, and as such are largely unaffected by the object response and thus form a good estimated rigid motion response that accounts for much of the object response. However, in other embodiments, the subset of sensor values thus obtained may form estimated rigid motion responses that are not as good at accounting for the object response, but are still useable as estimated rigid motion responses.

As discussed above, some embodiments use fitting techniques to determine the estimated rigid motion response. The fit may be to the entire set of sensor values, including values that are largely determined by object response and not rigid motion response. This is shown in FIG. 12, where the estimated rigid motion response is derived from a fit 1203 of all of the sensor values 1100.

The fitting techniques may also be applied to a partial set of sensor values. Any appropriate data analysis methods (e.g. thresholding, estimating positions, etc.) may be used to produce a subset of the sensor values to which a fit is made. Turning to FIG. 13, the sensor values 1300 are the subset of the sensor values 1100 that correspond to locations away from the position estimate 1101. The estimated rigid motion response is derived from a fit 1303 of this subset of sensor values 1300.

In either of these two embodiments, where the estimated rigid motion response may be reasonably assumed to be linear and/or planar, a linear fit or planar fit may be used. This may simplify the processing used to determine fits, whether done with the full set of sensor values or a subset of sensor values.

Turning to FIG. 14, the sensor values 1400 are the subset of the sensor values 1100 that are below a threshold 1401. The estimated rigid motion response is derived from a fit 1403 of this subset of sensor values 1400.

Turning to FIG. 15, this graph shows how sensor values that are removed may be use to produce an estimated rigid motion response that includes virtual sensor values. Any appropriate estimation method (straight line interpolation, etc.) may be used. For example, these virtual sensor values 1502 may be estimated using the sensor values in regions 1102. And, the estimated rigid motion response may be derived from the combination of the sensor values that are not removed 1500 and the virtual sensor values 1502.

These examples all account for the effects of capacitive coupling with the object(s) partially. Particular techniques may even substantially or entirely account for the effects of capacitive coupling with the object(s).

The estimated rigid motion responses may be used to determine object information, including force estimates, position estimates, etc.

The rigid motion response reflects the actual physical rigid motion of the at least one sensing electrode. As such, the estimated rigid motion response may be used to determine estimates about the force(s) causing the rigid motion.

A variety of techniques may be used to determine this force estimate from the estimated rigid motion response. For example, data correlating known force applications with rigid motion responses may be gathered, and a mapping between the two empirically determined. As another example, physical models correlating force applications to physical rigid motions, and physical rigid motion to capacitive effects, may be used to determine how rigid motion responses correspond to applied forces. For example, a mapping may be stored as thresholds, look-up tables, functions, etc. for determining force estimates using the estimated rigid motion response, as appropriate for the application.

The estimated rigid motion response may also be used to provide a position estimate or to refine a position estimate. For example, the parameters of the estimated rigid motion response may be used in making an estimate of the position(s) of object(s) in contact with the input surface. As one example, the estimated rigid motion response can be used to provide a more accurate estimated object response, and the estimated object response used to determine position estimate(s). For example, some embodiments use the rigid motion response to determine how an earlier position estimate should be adjusted. As another example, some embodiments remove the estimated rigid motion response from the set of sensor values to generate an object response. The object response can then be used with an appropriate position determination technique to produce position estimate(s) (and to estimate the number of input objects and thus the number of positions to estimate, as applicable.) as appropriate.

Some embodiments iterate the determination of estimated rigid motion responses, estimated object responses, and/or position estimates. For example, in some embodiments, a first position estimate is made from the sensor values, without regard for the rigid motion response; then, the first position estimate is used in determining a first estimated rigid motion response. Then, the first estimated rigid motion response is used to determine a second position estimate that is a refinement over the first position estimate. Various embodiments may not iterate any estimates, while others iterate once, twice, or more times.

Using the estimated rigid motion response to refine a position estimate may be useful in embodiments where the rigid motion response affects detrimentally the position estimates that are made without taking the rigid motion response into account. That is, in these embodiments, the rigid motion response is a significant contributor to the sensor values, relative to the accuracy needed in the position estimates; in such systems, determining the position estimates from the sensor values without accounting for the rigid motion response in part or whole, results in an error in position estimate that causes erroneous outputs or responses. Also, in some embodiments, a first position estimate made without accounting for the rigid motion response may be accurate enough for some uses (e.g. in waking up the device, determining where to focus data analyses efforts, determining the estimated rigid motion response, etc.), but not for some uses (e.g. fine cursor positioning, pointing, etc.).

Furthermore, estimated object responses, estimated rigid motion responses, and object information (including force estimates and position estimates) may be iterated zero, one or multiple times in an iterative fashion, with each iteration producing a more refined estimate. Various embodiments that perform such iterative determinations may performed a set number of iterations, until the estimate converges (e.g. the previous estimate and the current estimate is within a defined range), or both (e.g. until the estimate converges, but no more than N number of iterations).

In a first specific example of embodiments that do not iterate estimations, some embodiments determine an estimated rigid motion response from the sensor values, without using a position estimate in the determination. The embodiments may use the estimated rigid motion response to determine force and/or position estimates.

In a first specific example of embodiments that do iterate estimations, the process is similar to what is described in the paragraph above, except that a position estimate is determined, and that position estimate is used to produce a second estimated rigid motion response and a second force/and or position estimate, where the second estimate is a refinement over the first estimate.

In a second specific example of embodiments that do not iterate estimations, some embodiments determine an estimated rigid motion response from the sensor values, without using a position estimate in the determination. The embodiments may then use the estimated rigid motion response in combination with the sensor values to produce a position estimate (e.g. such as in accounting for the rigid motion response in the sensor values, to produce an estimated object response); or, the embodiments may then use the estimated rigid motion response to determine a force estimate; or the embodiments may do both.

In a second specific example of embodiments that do iterate estimations, the process is similar to what is described in the paragraph above, except that a position estimate is determined, and that position estimate is used to produce a second estimated rigid motion response and a second force and/or position estimate, where the second estimate is a refinement over the first estimate.

In a third specific example of embodiments that do iterate estimations, the embodiments determine a first position estimate and a first estimated rigid motion response from the sensor values. The estimated rigid motion response is then used with the first position estimate or the sensor values to determine a second position estimate. The second position estimate is then used with the sensor values or the first estimated rigid motion response to produce a second estimated rigid motion response. The second estimated rigid motion response is then used with the second position estimate or the sensor values to produce a third position estimate. Force estimates, if any, may be made from the first estimated rigid motion response, the second estimated rigid motion response, or both.

As described above, the estimated rigid motion response may be used to determine a variety of object information. in one embodiment the estimated rigid motion response is used to generate force estimates for the one or more objects applying force and causing the rigid motion. In one specific embodiment, these determined force estimates includes the force applied by each of multiple different individual fingers. This can be accomplished by using the position of the fingers determined by the sensing electrodes and the estimated rigid motion response.

Specifically, the estimated rigid motion response is directly related to the rigid motion of the at least one sensing electrode. For example, to how much, and in what directions the at least one sensing electrode has been displaced (e.g., translated and/or rotated in position relative to a conductor). This is particularly true where the electrode moves largely as a plane. Furthermore, such planar movement can be modeled as if the at least one sensing element were coupled to the device with a plurality of force sensors arranged about the sensor configured to provide a measure of the force applied to the surface.

Conceptually, the displacement of the at least one sensing electrode may be determined from the estimated rigid motion response, and may be used to determine an estimate of the force being applied by one or more fingers to cause the rigid motion. As with the determination of the estimated rigid motion response itself, the determination of force applied by one or more fingers may be accomplished in a variety of ways.

A detailed discussion of several exemplary techniques that can be employed to determine force estimates for one or more objects in the sensing region and causing rigid motion will not be discussed. Some techniques use the position information for each object determined by the input device and generate a plurality of measures of force to determine an amount of applied force for each object. Specifically, the technique uses a superposition of pseudo force values derived from the estimated rigid motion response based on the positional information for each of the multiple objects to determine the force applied for each object. In one implementation of this embodiment, this superposition is calculated using a pseudo-inverse matrix technique.

Such techniques may be described as generating pseudo force values for a virtual plurality of force sensors coupled to the at least one electrode. As one example, an input device may be modeled as having four force sensors at the corners of a sensing region, each of the force sensors providing a pseudo force value ($F_{TL}$, $F_{TR}$, $F_{BL}$, $F_{BR}$). It should be noted that these are not actual measured force values, but at instead virtual values derived from the estimated rigid motion response. It should also be noted that the techniques used to generate the force estimates for at least one object may not need to actually determine the pseudo force values to determine the force estimates, but that such pseudo values are instructive in describing how the force estimates is related to and may be derived from the estimated rigid motion response. Likewise, such techniques may not need to actually determine the displacement of the at least one sensing electrode, but again such a description is instructive in defining the relationship between the estimated rigid motion response and the force estimates.

In general, the pseudo force measurements are derived based on a knowledge of the relationship between the estimated rigid motion response and the physical movement of the at least one sensing electrode. For example, the relationship between the displacement of the at least one electrode and the estimated rigid motion response values may be described as:

$$\begin{cases} P_i = \sum_i F(\text{Dist}_{ij}) \\ P_j = \sum_j F(\text{Dist}_{ij}) \end{cases} \quad \text{Equation 1}$$

where $P_i$ and $P_j$ are the values from the two sensor set values, $\text{Dist}_{ij}$ is the distance between the center of an electrode element (for example a diamond) and a conductor, and F is a function describing the relationship between electrode distance and the rigid motion response (where such a function is found by modeling or direct measurements). Because the displacement of the at least one electrode is by rigid motion, the function F is known to be strictly monotonic (with pixel value decreasing with distance). As such, the function F is invertible and the relationship between the distance to the electrode profile values may be described as:

$$\text{Dist}_{ij} = \tilde{F}(P_i, P_j) \quad \text{Equation 2.}$$

Where $\tilde{F}$ is the inverse of the function F. Because the at least one sensing electrode is substantially rigid, the values for the distance $\text{Dist}_{ij}$ may be assumed to be aligned in a plane:

$$\text{Dist}_{ij} = Ax + By + C \quad \text{Equation 3.}$$

The values of A, B, and C may be determined using a suitable fitting technique, such as least mean square (LMS) technique. With the plane describing the displacement of the at least one electrode defined, the pseudo force values for each of the four corners may be described using Hooke's law and calculated from the values of A, B and C, and an elasticity constant k of the mounting system.

$$\begin{cases} F_{TL} = kC \\ F_{TR} = k(AW + C) \\ F_{BL} = k(BH + C) \\ F_{BR} = k(AW + BH + C) \end{cases} \quad \text{Equation 4}$$

Thus, a processing system of an input device may be configured to determine pseudo force values $F_{TL}$, $F_{TR}$, $F_{BL}$, and $F_{BR}$ from the estimated rigid motion response. The pseudo force values may then be used with determined positional information for one or more objects to determine force estimate for each of those one or more objects. Again, it may be noted that such a procedure may not actually require the overt calculation of such pseudo force values, but instead a direct calculation of the force estimate may be performed using the underlying principles. An example of such a technique will now be described. In this example, the position of objects within the sensing region is expressed using x and y coordinate position values. Thus, the position of two detected objects in the sensing region may be expressed as values $(x_0, y_0)$, $(x_1, y_1)$. Using a linear model, and assuming a rectangular sensor size of W×H, the relationship between the position of two detected objects $(x_0, y_0)$, $(x_1, y_1)$, four virtual force values $(F_{TL}, F_{TR}, F_{BL}, F_{BR})$, and the forces applied by the two objects $(F_0, F_1)$ may be expressed by the matrix equation:

$$\begin{bmatrix} 0.75 - \frac{x_0}{2W} - \frac{y_0}{2H} & 0.75 - \frac{x_1}{2W} - \frac{y_1}{2H} \\ 0.25 + \frac{x_0}{2W} - \frac{y_0}{2H} & 0.25 + \frac{x_1}{2W} - \frac{y_1}{2H} \\ 0.25 - \frac{x_0}{2W} + \frac{y_0}{2H} & 0.25 - \frac{x_1}{2W} - \frac{y_1}{2H} \\ -0.25 + \frac{x_0}{2W} + \frac{y_0}{2H} & -0.25 + \frac{x_1}{2W} + \frac{y_1}{2H} \end{bmatrix} \begin{bmatrix} F_0 \\ F_1 \end{bmatrix} = \begin{bmatrix} F_{TL} \\ F_{TR} \\ F_{BL} \\ F_{BR} \end{bmatrix}. \quad \text{Equation 5}$$

The matrix in Equation 5 describes a set of four equations with two unknowns (i.e., the forces $F_0$, $F_1$ applied by the two objects). Additionally, the sum of the forces applied to the sensor equals the sum of the measured forces. Thus, $F_0+F_1=F_{TL}+F_{TR}+F_{BL}+F_{BR}$.

The processing system of the input device may be adapted to solve for these two unknowns, and thus determine the two individual forces applied by the two input objects. Specifically, Equation 5 can be written in shorthand matrix form as:

$$AX=B \quad \text{Equation 6}$$

Where X is the matrix containing the force elements $F_0$, $F_1$ to be solved for. The pseudo-inverse relationship of this matrix equation can be expressed as:

$$X=(A^T A)^{-1} AB \quad \text{Equation 7}$$

Thus, using a pseudo-inverse matrix technique, the processing system can solve for the force values $F_0$, $F_1$ for both objects. Specifically, the pseudo-inverse matrix technique (sometimes referred as a generalized inverse technique) provides a technique that may be used to solve over-determined systems where there are more equations than unknowns by minimizing the error in the solution. In some implementations, this technique is configured to minimize a global error. In other implementations, this technique is configured to minimize a least mean squares error. In either case, the pseudo-inverse matrix technique minimizes the error to provide a solution to the set of equations. It should be noted the pseudo-inverse matrix technique is just one example of the types of the techniques that may be used, and in general, any technique that may be used to solve an over-determined system may be used.

Thus, the processing system may receive the position information for each of two objects $(x_0, y_0)$, $(x_1, y_1)$, generate four pseudo force values $(F_{TL}, F_{TR}, F_{BL}, F_{BR})$ from the estimated rigid motion response, and from this determine the individual forces $(F_0, F_1)$ that are being applied by each of the two objects.

Such a system may also solve for the forces applied to the surface by three objects $(F_0, F_1, F_2)$ as long as the three objects are in a non-collinear arrangement. In that example, the matrix equation:

$$\begin{bmatrix} 0.75 - \frac{x_0}{2W} - \frac{y_0}{2H} & 0.75 - \frac{x_1}{2W} - \frac{y_1}{2H} & 0.75 - \frac{x_2}{2W} - \frac{y_2}{2H} \\ 0.25 + \frac{x_0}{2W} - \frac{y_0}{2H} & 0.25 + \frac{x_1}{2W} - \frac{y_1}{2H} & 0.25 + \frac{x_2}{2W} - \frac{y_2}{2H} \\ 0.25 - \frac{x_0}{2W} + \frac{y_0}{2H} & 0.25 - \frac{x_1}{2W} - \frac{y_1}{2H} & 0.25 - \frac{x_2}{2W} - \frac{y_2}{2H} \\ -0.25 + \frac{x_0}{2W} + \frac{y_0}{2H} & -0.25 + \frac{x_1}{2W} + \frac{y_1}{2H} & -0.25 + \frac{x_2}{2W} + \frac{y_2}{2H} \end{bmatrix} \begin{bmatrix} F_0 \\ F_1 \\ F_2 \end{bmatrix} = \begin{bmatrix} F_{TL} \\ F_{TR} \\ F_{BL} \\ F_{BR} \end{bmatrix}. \quad \text{Equation 8}$$

defines the forces $(F_0, F_1, F_2)$ applied by the three objects that are to be determined This matrix equation describes a set of four equations with three unknowns, and the processing system may be adapted to solve for those unknowns using the same pseudo-inverse relationship described above.

These examples provide the ability to determine the forces applied by two or three objects in the sensing region. It should be noted that while these examples describe a technique that conceptually uses four pseudo force values, that other processing techniques may used different calculations.

When so determined, the force values may be used to facilitate a wide array of user interface functionality. As descried above, the system may be used to enable any type of user input based on both force and proximity indications. For example, continuous measurements of force and proximity for multiple objects may be used for extended zooming, scrolling or rotating. It may also be used for virtual keyboard applications and press to select gestures. Likewise, the system may respond differently depending upon which fingers are pressing with what force. The ability to determine the force applied for each of multiple fingers, and to provide different input actions in response to such determined forces, provides a wide flexibility in facilitating user input options.

The embodiments of the present invention provide devices and methods that facilitate improved sensor devices. Specifically, the devices and methods provide the ability to determine object information for objects causing rigid motion on a capacitive sensor device. Example object information includes positional information and force estimates, such as for objects causing rigid motion. The devices and methods at least partially account for the effects of capacitive coupling with the objects causing the rigid motion in determining the object information.

Thus, the embodiments described herein provide the ability to determine an estimated rigid motion response that at least partially accounts for effects of capacitive coupling with the object(s) in contact with the input surface. The processing system is further configured to determine object information using the estimated rigid motion response. Where the input device is used to direct an electronic system, the object information may be used to facilitate a variety of interface actions on a variety of different electronic systems.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A capacitive sensor device comprising:
   an input surface contactable by objects in a sensing region;
   at least one sensing electrode configured to capacitively couple with objects in the sensing region; and
   a processing system communicatively coupled to the at least one sensing electrode, the processing system configured to:
      obtain a set of sensor values using the at least one sensing electrode;
      determine an estimated rigid motion response associated with a substantially rigid motion of the at least one sensing electrode using the set of sensor values, the substantially rigid motion caused by at least one object in contact with the input surface, wherein the processing system, when determining the estimated rigid motion response, at least partially accounts for effects of capacitive coupling between the at least one sensor electrode and the at least one object in contact with the input surface; and
      determine object information using the estimated rigid motion response, the object information being related to the at least one object in contact with the input surface.

2. The capacitive sensor device of claim 1 herein the processing system is configured to determine object information using the estimated rigid motion response by:
   determining a position estimate for the at least one object in contact with the input surface using the estimated rigid motion response.

3. The capacitive sensor device of claim 1 wherein the processing system is configured to determine object information using the estimated rigid motion response by:
   determining a force estimate for force applied by the at least one object in contact with the input surface using the estimated rigid motion response.

4. The capacitive sensor device of claim 3 wherein the at least one object comprises a plurality of objects, and wherein the processing system is configured to determine the force estimate for each of the plurality of objects by:
   using the estimated rigid motion response and a position estimate for each of the plurality of objects.

5. The capacitive sensor device of claim 1 wherein the processing system is configured to determine the estimated rigid motion response by:
   fitting a parameterized function to at least part of the set of sensor values.

6. The capacitive sensor device of claim 1 wherein the processing system is configured to determine the estimated rigid motion response by:
   determining a position estimate for the at least one object in contact with the input surface; and
   using the position estimate to at least partially account for effects of capacitive coupling between the at least one sensor electrode and the at least one object in contact with the input surface.

7. The capacitive sensor device of claim 1 wherein the processing system is configured to determine the estimated rigid motion response by:
   determining a position estimate for the at least one object in contact with the input surface;
   determining a subset of the set of sensor values corresponding to locations away from the position estimate, wherein the subset is a non-empty, proper subset of the set of sensor values; and
   using the subset to determine the estimated rigid motion response.

8. The capacitive sensor device of claim 1 further comprising:
   a conductor proximate to the at least one sensing electrode, wherein the estimated rigid motion of the at least one sensing electrode changes a spatial arrangement between the at least one sensing electrode and the conductor, such that the estimated rigid motion changes a capacitive coupling between the at least one sensing electrode and the conductor.

9. The capacitive sensor device of claim 8 further comprising:
   a display screen underlying the at least one sensing electrode, wherein the display screen comprises the conductor, and wherein the conductor is configured for use in displaying images on the display screen.

10. A touch-screen user interface device comprising:
    an input surface contactable by objects in a sensing region;
    a display screen underlying the input surface, wherein the display screen comprises a conductor configured for use in displaying images on the display screen,
    at least one sensing electrode proximate to the conductor and located between the input surface and the display screen, the at least one sensing electrode configured to capacitively couple with the conductor and objects in the sensing region; and
    a processing system communicatively coupled to the at least one sensing electrode,
       the processing system configured to:
       obtain a set of sensor values using the at least one sensing electrode;
       determine an estimated rigid motion response associated with a substantially rigid motion of the at least one sensing electrode relative to the conductor using the set of sensor values, the substantially rigid motion caused by force applied by at least one object to the input surface, wherein the estimated rigid motion response at least partially accounts for effects of capacitive coupling between the at least one sensor electrode and the at least one object; and
       determine a force estimate for the force applied by the at least one object in contact with the input surface using the estimated rigid motion response.

11. A method for responding to user input provided to a sensor device having at least one sensing electrode, wherein conductive material in the at least one sensing electrode is configured to capacitively couple to objects in a sensing region, the method comprising:

obtaining a set of sensor values using the conductive material;

determining an estimated rigid motion response associated with a substantially rigid motion of the at least one sensing electrode using the set of sensor values, the substantially rigid motion caused by a force applied by an input object to the sensor device, wherein the estimated rigid motion response at least partially accounts for effects of capacitive coupling between the at least one sensor electrode and the input object;

determining object information about the input object using the estimated rigid motion response; and generating an output indicative of the object information.

12. The method of claim 11, wherein the determining the object information about the input object using the estimated rigid motion response comprises:

determining a position estimate for the input object using the estimated rigid motion response.

13. The method of claim 11, wherein the determining the object information about the input object using the estimated rigid motion response comprises:

determining a force estimate for the force applied by the input object using the estimated rigid motion response.

14. The method of claim 11, wherein the determining the estimated rigid motion response comprises:

fitting a parameterized function to at least part of the set of sensor values.

15. The method of claim 11, wherein the determining the estimated rigid motion response comprises:

determining a position estimate for the object; and using the position estimate to at least partially identify capacitive coupling effects associated with the object.

16. The method of claim 11, wherein the determining the estimated rigid motion response comprises:

determining a position estimate for the input object;

determining a subset of the set of sensor values corresponding to locations away from the position estimate, wherein the subset is a non-empty, proper subset of the set of sensor values; and using the subset to determine the estimated rigid motion response.

17. A processing system for a capacitive input device, the processing system comprising:

a data acquisition module configured to acquire a set of sensor values using at least one sensing element of the input device, the at least one sensing element configured to capacitively sense input near the sensing element; and a determiner module configured to:

determine an estimated rigid motion response associated with a substantially rigid motion of the at least one sensing element using the set of sensor values, the substantially rigid motion caused by a force applied by an object to the input device near the sensing element, wherein the estimated rigid motion response at least partially accounts for effects of capacitive coupling with the object; and determine object information about the object using the estimated rigid motion response.

18. The processing system of claim 17, wherein the determiner module is configured to determine object information about the object using the estimated rigid motion response by:

determining a position estimate for the object using the estimated rigid motion response.

19. The processing system of claim 17, wherein the determiner module is configured to determine object information about the object using the estimated rigid motion response by:

determining a force estimate for the force applied by the object using the estimated rigid motion response.

20. The processing system of claim 17, wherein the determiner module is configured to determine the estimated rigid motion response by:

fitting a parameterized function to the set of sensor values.

21. The processing system of claim 17, wherein the determiner module is configured to determine the estimated rigid motion response by:

determining a position estimate for the object; and using the position estimate to at least partially account for effects of capacitive coupling between the at least one sensing element and the object.

* * * * *